June 4, 1940.  J. L. WILLIAMS  2,203,273
MILLING MACHINERY
Filed Nov. 24, 1937  2 Sheets-Sheet 1

Inventor;
John Leslie Williams,
by Potter, Pierce & Scheffler,
Attorneys.

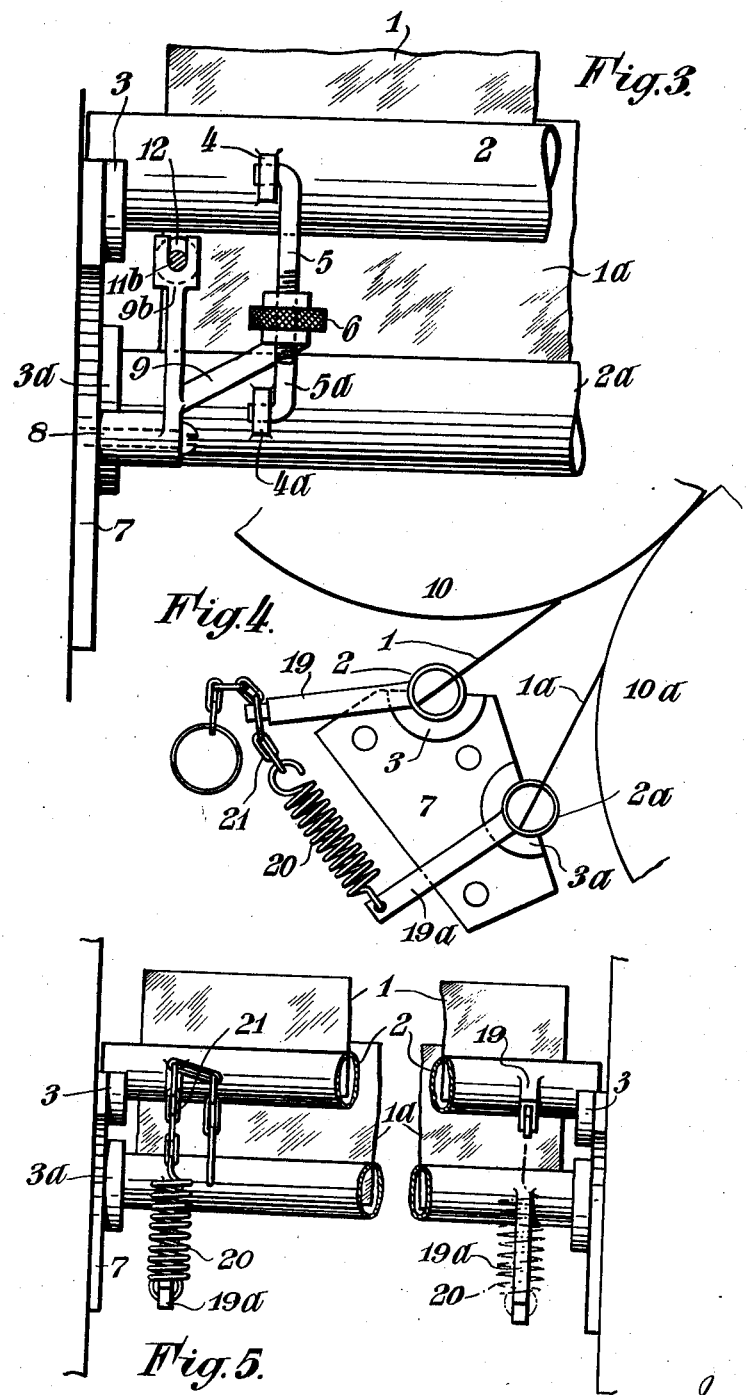

Patented June 4, 1940

2,203,273

UNITED STATES PATENT OFFICE 2,203,273

MILLING MACHINERY

John Leslie Williams, London, England, assignor to Gardiner's Conveyors Limited, Bermondsey, London, England, a British company Application November 24, 1937, Serial No. 176,363
In Great Britain December 11, 1936

8 Claims. (Cl. 83—12)

This invention relates to milling machinery, and is especially concerned with improvements in roller mills in which the grinding or crushing of the material is effected between metal rollers which act to reduce it to a pulverised product.

Examples of such mills are employed for grinding, crushing or pulverising grain for making flour, or for milling chocolate, cocoa, paint and like material.

The invention will be described hereafter with reference to flour milling, but it is not intended to be limited herein to any one material.

Such roller mills depend for their efficiency on the action of the two metal surfaces of the rollers directly on the material being ground or crushed, and it is therefore important that the surface of the rollers shall be kept clean while in operation, and that the formation of films or flakes of ground or crushed material on the surface of the rollers shall be avoided, since otherwise the grain or the like will be subject to pressure between layers of previously ground or crushed material instead of between metal surfaces. If this occurs, the co-acting metal surfaces of the rollers may be held apart by a film or ring of crushed material with the result that the milling will proceed in an unsatisfactory manner, the output being reduced or even stopped, and in any case imperfect grinding will generally be apparent in the product.

Usually a rigid scraper bar is arranged to contact with the periphery of each roller to keep it free of film. Such scraper bars, however, have been found to be generally unreliable in operation, particularly as the parallelism of the rollers in relation to the scraper may be disturbed in course of adjustment during operation, the efficient contact of the scraper bar with the roller being a matter of precision.

In the case of the usual rigid bar type of scraper, it is obvious that when any mal-alignment of the roller occurs, the scraper may be in contact with the roller at one end, but that the space between the roller and the scraper at the other end will be appreciable, owing to the relatively great length which is usually in the neighbourhood of forty inches.

With a view to maintaining the whole length of the bar in effective contact with the roller at every point, the scraper is generally loaded so as to exert considerable pressure on the roller, with the result that wear and tear on the roller is increased, and undesired heat is generated by friction. Furthermore, in spite of the application of this undesirable pressure, the rigid scraper bar will not, under working conditions, maintain effective scraping contact at all parts of the roller surface.

With a view to obviating the disadvantages of the rigid scraper bar, a stationary brush has been utilised but this, although to some extent overcoming the defects of the rigid scraper bar, is not so efficient as a metal scraper, and, owing to eventual distortion or bending of the bristles of the brush, the efficiency deteriorates after a comparatively short period of use.

Furthermore, flexible metal scrapers have been proposed but these proposals do not provide either for self-alignment of the scraper in relation to the associated roller or for a high degree of resilience to afford effective scraping action with very light contact pressure.

The present invention has for its object to provide improved apparatus for cleaning the rollers of such mills, whereby the utmost efficiency and reliability, as well as longevity of the apparatus may be secured.

According to the present invention, apparatus for scraping clean the surface of rollers in grinding or crushing machinery for milling comprises one or more scraping elements each consisting of a thin strip of flexible metal such as spring steel loosely located in a lonigtudinal slot formed in a member pivotally disposed on a longitudinal axis parallel to the axis of the associated roller, whereby the scraping element is freely movable and/or is capable of rocking in relation to the said member to permit of the scraping element aligning itself parallel with the said roller.

Preferably the scraping element consists of a strip of flexible and springy steel having a thickness of about eight-thousandths of an inch and is of sufficient width to project from the slotted member to an extent ensuring a high degree of flexibilty and consequent evenly distributed pressure on the scraping edge. Owing to the self-aligning action of the scraping element and to the fact that even contact along the whole of the scraping edge is ensured by the flexibility of the strip itself, it is possible to secure highly efficient scraping with a minimum of pressure of the scraping elements on the rollers, thus reducing wear on the rollers and avoiding any heating thereof.

In order to facilitate the aforesaid rocking movement of the scraping element in the locating slot therefor, the inner longitudinal edge of the strip resting in the slot may be curved or otherwise suitably shaped or the strip may be rockably mounted in the slot in any other suitable manner.

Preferably the pivotally disposed member carrying the scraping element is in the form of a slotted tube.

The invention moreover includes means interconnected with roller-shifting mechanism in a manner known per se and adapted to effect angular movement of the slotted member or members about the pivotal axis or axes thereof so that the action of separating the rollers automatically disengages the scraping element or elements. Two scraping elements co-operating with the respective rollers may be mounted in slotted members provided with arms or lugs connected by links to a rocking member interconnected with the roller-shifting means. Furthermore, independent adjusting means may be provided to control the pressure of each flexible scraping element on the respective roller and such independent adjustment may be effected by the provision of adjustable links between the arms or lugs on the slotted members and the rocking member.

Common tensioning means may be provided to control the pressure of two flexible scraping elements on the associated rollers. For example, the slotted members carrying the flexible scraping elements may be provided with arms projecting therefrom in such manner that by interconnecting the said arms with adjustable link means equal and adjustable pressure is maintained simultaneously on both scraping elements. Such adjustable link means may include a spring.

One embodiment of the invention will now be described with reference to the accompanying drawings, whereof:

Fig. 3 is a part elevation of the mechanism shown in Fig. 1;

Figs. 4 and 5 are respectively a side view and an elevation showing a preferred method of adjusting the tension of the scrapers.

Throughout the specification and drawings like parts will be referred to and illustrated by like reference numerals.

Figure 1:
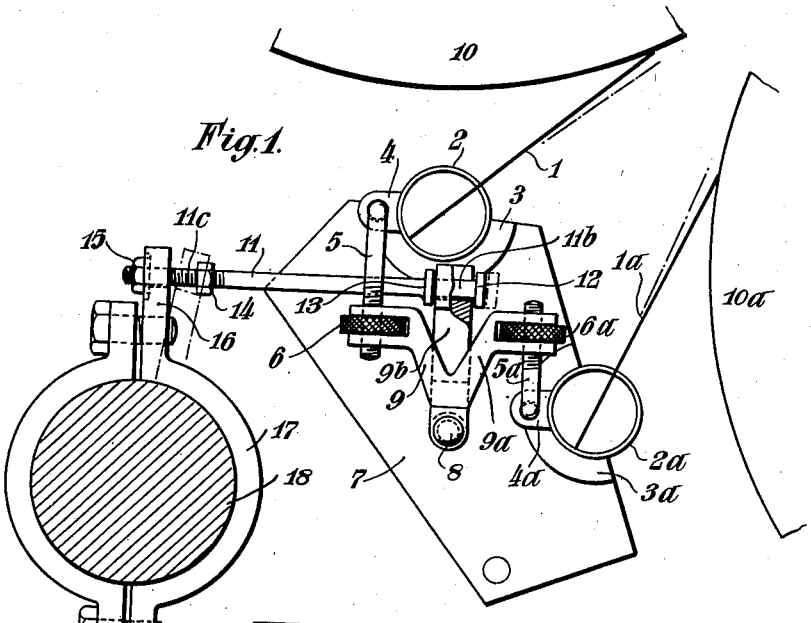
Fig. 1 represents a part-sectional side view of a pair of scrapers acting on two co-operating rollers.
Figure 2:
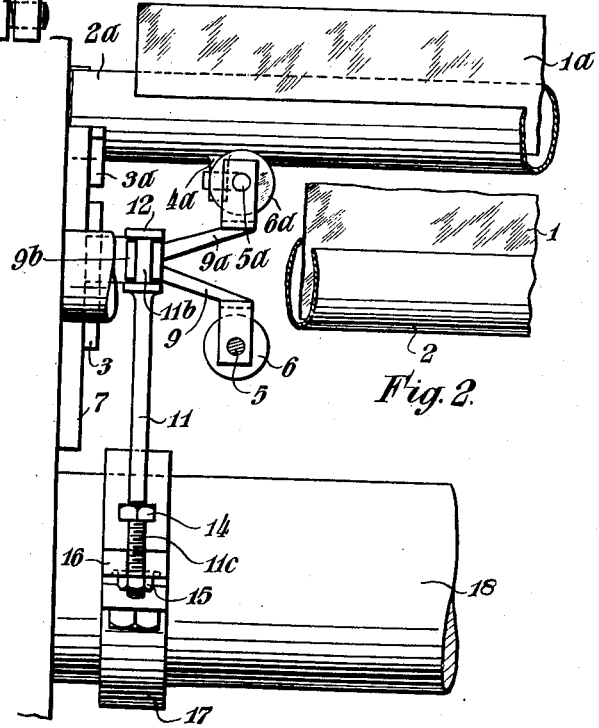
Fig. 2 is a part plan view of Fig. 1.

In the present embodiment, the scrapers each comprise a single strip of flexible and springy steel 1, 1ª carried in members 2, 2ª comprising metal tubes provided with longitudinal slots extending substantially the whole of their length, whereby the scraper members 1, 1ª are located throughout the whole of their length.

The strip in the present example is preferably about $8/1000''$ in thickness and is carried loosely in the slot with a substantial portion of its width projecting from the member 2 or 2ª, thus ensuring the utmost flexibility and consequent even pressure of the scraping edge on the roller throughout its length.

Various methods may be employed to retain the scraper strips 1, 1ª in the tubes 2, 2ª. For example, one or more screws or pins may extend transversely through the tubes 2, 2ª at various points, and through clearance holes in the strips 1, 1ª so that, whilst each strip is loosely located with respect to its tube, it cannot be dislodged entirely therefrom.

The mounting of the scraper strip loosely in the aforesaid longitudinal slots permits of a certain amount of rocking movement of the strip in relation to the slotted member 2 or 2ª so that each scraper strip can align itself parallel with the associated roller. In order to facilitate this self-aligning action the inner longitudinal edge of the strip resting in the tube may be curved or otherwise suitably shaped to engage the bottom of the tube at a substantially middle position in the length thereof. The strip may be rockably mounted in the slot or the like in any other suitable manner.

It should be understood that it is customary with mills of the kind herein referred to, to separate the grinding rollers during a time when the mill is running idle. For this purpose a main shaft operates the rollers, said shaft passing through the hopper and being connected by levers to the rollers so that a partial turn of the shaft disengages the rollers from each other.

The present construction provides for automatic disengagement of the scrapers from the rollers as will now be described.

The scrapers 1, 1ª operate on the two rollers 10, 10ª of the grinding mill, and in Figs. 1 and 4 are shown in engagement with the said roller surfaces, the dotted lines in Fig. 1 indicating their position when out of engagement.

The tubes 2, 2ª are rotatably carried in bearings or sockets 3, 3ª at their ends, which sockets may either comprise fully circular enclosed bearings or, as in the present case, semi-circular open bearings, the pressure of the scrapers being sufficient to maintain the tubes in their sockets.

To allow for engagement and disengagement of the scrapers from the roller, each tube carries, at one or both ends, an arm 4, 4ª to which are respectively pivoted adjustable links 5, 5ª, which are threaded at their opposite ends to carry knurled adjusting nuts 6, 6ª.

Adjacent the bearings, and pivotally mounted on the side member 7 of the mill, is a three-armed bellcrank lever mounted on an axis 8, two of its arms 9, 9ª being forked to receive the respective adjusting nuts 6, 6ª whereby movement of the nuts 6, 6ª on the adjustable links 5, 5ª, allows for adjustment of the tubes 2, 2ª relative to the arms 9, 9ª of the bellcrank lever, and hence for individual and relative adjustment of the scrapers 1, 1ª, both with respect to each other, and to the individual rollers 10, 10ª with which they are in contact.

The third arm 9ᵇ of the bellcrank lever is slotted at its free end to carry detachably the end 11ᵇ of a conecting rod 11 furnished with a pair of spaced collars 12 and 13. The opposite end 11ᶜ of the connecting rod is threaded and carries adjusting nuts 14 and 15 for the purpose of connecting it to a projection 16 of a split clamping ring 17, mounted on the main shaft 18 operating the rollers 10 and 10ª for the purpose of bringing them into and out of engagement with each other in known manner. As can be seen the position of the scrapers with respect to the rollers can be adjusted individually by means of the nuts 6, 6ª, and adjusted in combination by means of movement of the connecting rod 11. Simultaneous adjustment of the tension of the scrapers may therefore be performed by adjusting the position of the connecting rod 11 relative to the split clamping ring 17.

As above described, the roller operating rod 18 passes through the hopper of the mill, and is adapted to be rotated through a partial turn to separate the rollers 10 and 10ª by moving the lower roller 10ª out of engagement with the upper roller 10.

It will thus be seen that when the roller operating rod 18 is moved, the projection 16 on the clamping ring will turn, and exert a push on the connecting rod 11, which will in turn rotate the bellcrank lever about its pivot 8, and, by means of the two connecting links 5, 5ª, the two tubes 2, 2ª holding the scrapers 1, 1ª will be turned and thus disengage the said scrapers from the surfaces of the rollers 10, 10ª. When the roller operating rod is moved in the reverse direction, that is to say, in a direction to re-engage the bottom roller with the upper roller, the scrapers will again be brought into contact with the roller surfaces.

The arrangement is such that the engagement and disengagement of the scrapers does not interfere with normal adjustment of their contact pressure against the roller surfaces.

If desired, a lost motion arrangement may be employed at one or other end of the connecting rod 11, so that the main shaft 18, operating the rollers, may be free to turn through part of its travel before operating the scrapers.

It is desirable to split the clamping ring 17 to facilitate the fitting of it to the main shaft 18, and for ease of initial adjustment and setting, on assembly.

In an alternative construction, as shown in Figs. 4 and 5, the interconnection of the scrapers 1, 1ª with the main shaft 18, operating the roller mechanism, is dispensed with, so that the scrapers 1, 1ª are normally in permanent engagement with the roller surfaces.

In this construction the tubes 2, 2ª each carry a projecting arm 19, 19ª so positioned that by connecting their free ends by a link, (later described) adapted to pull the free ends together, a torque is imparted to the supporting tubes 2, 2ª in such a manner as to press the scrapers 1, 1ª on to the rollers 10, 10ª.

In the construction shown, a tensioning adjustment is provided in the form of a spring 20 and a chain 21 arranged so that individual links of the chain may be slipped over the free end of the arm 19 to which it is attached, to afford an adjustment of the distance of the free ends of the arms 19, 19ª.

Alternatively, a flexible non-extensible connection between the arms may be employed, for example by a chain, and a separate spring or other resilient action may be employed to exert a lateral stress on the chain for example, a jockey pulley or the like, so that a stress is exerted, sufficient to press the scrapers 1, 1ª on to the rollers, with an equal pressure.

In both the constructions described above in detail, it is only necessary to exert a torque on the tube 2, 2ª at one end thereof, by virture of the inherent resilience in the steel strip employed for the scrapers. If desired, however, adjustment can be made by employing tensioning devices at more than one place on the tube, for example, one at each end.

If desired, the tensioning of the scrapers for contact pressure on the roller may be effected by means of an eccentrically mounted presser-bar or its equivalent, adapted, upon rotation, to exert an increasing pressure on the scraper elements.

Such presser-bar could either act simultaneously on both scrapers, or each scraper element could be maintained in contact with its associated roller surface by an individual presser-bar, the several bars being interconnected by any suitable means.

What I claim and desire to secure by Letters Patent is:

1. Apparatus for scraping clean the surface of elongated rollers in grinding or crushing machinery for milling, comprising an elongated blade supporting member pivotally mounted on a longitudinal axis parallel to the axis of an associated mill roller, and a scraping blade consisting of an elongated flexible metal strip having a thickness of about eight-thousandths of an inch, said blade supporting member having a longitudinal slot therein dimensioned to loosely receive said blade, said blade being loosely disposed in said longitudinal slot of said supporting member and having sufficient width that the major portion thereof projects from said slot and having the longitudinal edge thereof disposed within said slot curved in the direction of its length to provide a rocking contact between the blade and said supporting member, whereby to permit free motion of said blade in said slot in aligning itself with said roller and to ensure high flexibility and evenly distributed pressure throughout the length of the scraping edge of said blade in contact with said roller.

2. Apparatus for scraping clean the surface of elongated rollers in grinding and milling machines comprising an elongated scraper blade supporting member in the form of a substantially cylindrical tube pivotally mounted on a longitudinal axis parallel to the axis of an associated mill roller, said tube having a longitudinal blade receiving slot in the wall thereof, and a scraper blade consisting of a thin elongated flexible metal strip loosely disposed in the slot in said tube with at least a portion of the edge of the blade within said tube engaging the inner wall of the tube at a point remote from said slot, whereby to permit free action of said blade in aligning itself with said roller when the free edge thereof is in scraping contact with the surface of said roller.

3. Apparatus according to claim 2 wherein said blade is a flexible metal strip about eight-thousandths of an inch in thickness and has a width in relation to the diameter of the tube such that the major portion of said blade projects from said slot.

4. In a roll scraper construction of the character described, an elongated blade supporting member pivotally mounted on a longitudinal axis parallel to the axis of an associated roller, said blade supporting member comprising means defining a longitudinal slot parallel to the axis of said member and a concave curvilinear surface facing said slot in spaced relation thereto with the axis of said surface parallel to said slot, and an elongated thin flexible metal scraper blade loosely seated in said slot with one edge normally contacting said concave curvilinear surface and with a substantial portion of said strip in the direction of its width projecting from said slot.

5. Apparatus for scraping clean the surface of elongated rollers in grinding or crushing machinery for milling, comprising an elongated blade supporting member pivotally mounted on a longitudinal axis parallel to the axis of an associated milling roller, said blade supporting member having a longitudinal blade receiving slot therein and a concave curvilinear surface facing the entrance of said slot in spaced relation thereto with the axis of said surface extending parallel to said slot, and a scraping blade consisting of a thin elongated flexible metal strip mounted in said longitudinal slot with one edge engaging said curvilinear surface and a substantial portion of said blade in the direction of its scraping edge projecting from the slot, said blade having a loose fit in said slot and being capable of free rocking movement therein relative to the blade supporting member to permit said blade to align its scraping edge parallel to the surface of the roller with equality of contact pressure between blade and roller throughout the length thereof.

6. Apparatus for scraping clean the surface of milling rollers, comprising an elongated scraper supporting member pivotally mounted on a longitudinal axis parallel to the axis of an associated roller and having a longitudinally extending blade receiving slot therein, a scraper blade consisting of a thin elongated flexible metal strip loosely fitting said slot and freely disposed therein with the major portion of its width projecting therefrom, said scraper supporting member having a concave curvilinear surface positioned to seat the edge of said blade disposed in said slot and having its axis extending parallel to said slot, the loose mounting of said blade in said slot permitting free motion of said blade in said slot in aligning itself with said roller when the free longitudinal edge thereof is brought into scraping contact with the surface of the roller by rocking of said blade supporting member on its longitudinal axis.

7. Apparatus for scraping clean the surface of elongated rollers in grinding or crushing machinery for milling, comprising an elongated blade supporting member pivotally mounted on a longitudinal axis parallel to the axis of an associated mill roller, a scraping blade consisting of an elongated flexible metal strip having a thickness of about eight-thousandths of an inch, said blade supporting member having a longitudinal slot therein dimensioned to loosely receive said blade and a concave curvilinear surface facing the entrance of said slot in spaced relation thereto with the axis of said surface extending parallel to said slot, said blade being loosely disposed in said slot with one edge engaging said curvilinear surface and said blade having sufficient width that the major portion thereof projects from said slot, whereby to permit free motion of said blade in said slot in aligning itself with said roller and to ensure high flexibility and evenly distributed pressure throughout the length of the scraping edge of said blade in contact with said roller.

8. In a roll scraper construction of the character described, an elongated blade supporting member comprising an elongated tubular blade holder disposed with its axis parallel to that of an associated mill roller and having a longitudinal blade receiving slot in the wall thereof, the wall of said tube opposite said slot providing a concave curvilinear surface adapted to seat the edge of a blade disposed in said slot, and a scraper blade consisting of a thin elongated flexible metal strip loosely disposed in the slot in said tube with the edge of said blade within said slot engaging said curvilinear surface.

JOHN LESLIE WILLIAMS.